(12) United States Patent
Budinski et al.

(10) Patent No.: US 7,820,335 B2
(45) Date of Patent: Oct. 26, 2010

(54) PLATE FOR A FUEL CELL ASSEMBLY

(75) Inventors: Michael K. Budinski, Pittsford, NY (US); William Pettit, Rochester, NY (US); Ivan D. Chapman, Victor, NY (US)

(73) Assignee: GM Global Technology Operations, Inc., Detroit, MI (US)

( * ) Notice: Subject to any disclaimer, the term of this patent is extended or adjusted under 35 U.S.C. 154(b) by 514 days.

(21) Appl. No.: 11/842,650

(22) Filed: Aug. 21, 2007

(65) Prior Publication Data

US 2009/0053563 A1 Feb. 26, 2009

(51) Int. Cl.
*H01M 2/14* (2006.01)
*H01M 8/02* (2006.01)

(52) U.S. Cl. .................. 429/457; 429/458; 429/463; 429/514

(58) Field of Classification Search .................. 429/12, 429/13, 32, 34, 103, 38, 457, 458, 463
See application file for complete search history.

(56) References Cited

U.S. PATENT DOCUMENTS

| | | | |
|---|---|---|---|
| 3,985,576 A * | 10/1976 | Lingscheit et al. .......... | 429/103 |
| 5,945,232 A | 8/1999 | Ernst et al. | |
| 6,080,503 A | 6/2000 | Schmid et al. | |
| 6,127,058 A | 10/2000 | Pratt et al. | |
| 6,495,278 B1 | 12/2002 | Schmid et al. | |
| 2002/0001743 A1* | 1/2002 | Davis ........................... | 429/34 |
| 2003/0091884 A1* | 5/2003 | Scartozzi ..................... | 429/32 |
| 2003/0180594 A1 | 9/2003 | Choi et al. | |
| 2004/0157103 A1* | 8/2004 | Takeguchi et al. ............ | 429/32 |
| 2006/0163771 A1* | 7/2006 | Owens et al. ................ | 264/250 |
| 2006/0240309 A1* | 10/2006 | Dehne .......................... | 429/38 |

FOREIGN PATENT DOCUMENTS

| JP | 827 3696 | 10/1996 |
|---|---|---|
| JP | 2006 108027 | 4/2006 |

OTHER PUBLICATIONS

"Fuel Cell End Plate Assembly", Anonymous Author, Research Disclosure Database No. 482121, Jun. 2004.*
"Coatings for Polymer Substrates", Cerac Coating Materials News, vol. 10, Issue 4, Dec. 2000.*

* cited by examiner

*Primary Examiner*—Jonathan Crepeau
*Assistant Examiner*—Kenneth Douyette
(74) *Attorney, Agent, or Firm*—Fraser Clemens Martin & Miller LLC; J. Douglas Miller

(57) ABSTRACT

A unitized plate such as a bipolar plate for a fuel cell assembly is provided. The unitized plate includes a plurality of active regions electrically insulated from one another, and a plurality of inlet and outlet apertures formed in the plate. Each of the active regions is in fluid communication with a dedicated inlet aperture adapted to selectively deliver gaseous reactants thereto. A fuel cell assembly having a plurality of independently operable fuel cell stack units, and a method for operating the fuel cell assembly, is also provided.

6 Claims, 3 Drawing Sheets

US 7,820,335 B2

PLATE FOR A FUEL CELL ASSEMBLY

FIELD OF THE INVENTION

The present disclosure relates to a fuel cell assembly, and more particularly to a plate such as a bipolar plate for a fuel cell assembly having a plurality of active regions electrically insulated from one another.

BACKGROUND OF THE INVENTION

A fuel cell has been proposed as a clean, efficient and environmentally responsible power source for electric vehicles and various other applications. In particular, the fuel cell has been identified as a potential alternative for the traditional internal-combustion engine used in modern vehicles.

One type of fuel cell is known as a proton exchange membrane (PEM) fuel cell. The PEM fuel cell typically includes three basic components: a cathode, an anode, and an electrolyte membrane. The cathode and anode typically include a finely divided catalyst, such as platinum, supported on carbon particles and mixed with an ionomer. The electrolyte membrane is sandwiched between the cathode and the anode to form a membrane-electrolyte-assembly (MEA). The MEA is often disposed between porous diffusion media (DM) which facilitate a delivery of gaseous reactants, typically hydrogen and oxygen from air, for an electrochemical fuel cell reaction.

As described in U.S. Pat. No. 6,127,058, individual fuel cells may be aligned in a planar array that is electrically connected via interconnect tabs. In U.S. Pat. Nos. 6,080,503 and 6,495,278, electrochemical fuel cell stacks having adhesively bonded layers formed for individual fuel cell modules are also described. PEM-type fuel cell assemblies having multiple parallel fuel cell substacks that employ shared fluid plate assemblies and shared membrane electrode assemblies are also disclosed in U.S. Pat. No. 5,945,232.

In automotive applications, individual fuel cells are often stacked together in series to form a fuel cell stack with a voltage sufficient to provide power to an electric vehicle. Connecting individual fuel cells in series requires the fabrication and handling of a multitude of individual fuel cells, however. A height of the resultant fuel cell stack having the multitude of individual fuel cells may limit placement of the fuel cell stack within an electric vehicle. Furthermore, DC-to-DC voltage converters are typically employed in fuel cell systems to enable the fuel cell stack to achieve the sufficient voltage. Voltage converters and related componentry add undesirable complexity to the fuel cell system.

There is a continuing need for a simplified fuel cell assembly which militates against the need for DC-to-DC converters, the need to fabricate a multitude of individual fuel cells, and facilitates a placement of the fuel cell assembly within a vehicle.

SUMMARY OF THE INVENTION

In concordance with the instant disclosure, a simplified fuel cell assembly which militates against the necessity for DC-to-DC converters, militates against the necessity to fabricate multiple individual fuel cells, and facilitates a placement of the fuel cell assembly in a vehicle, is surprisingly discovered.

In one embodiment, a unitized fuel cell plate includes a plurality of active regions formed thereon and electrically insulated from one another. The unitized fuel cell plate further includes a plurality of inlet and outlet apertures formed therein. Each one of the plurality of active regions is in fluid communication with one of the inlet apertures. The one of the inlet apertures is adapted to selectively deliver reactants to the one of the plurality of active regions.

In another embodiment, a fuel cell assembly is provided. The fuel cell assembly includes a plurality of fuel cell stack units disposed adjacent one another and electrically connected in series. The fuel cell stacks may be formed with a plurality of the unitized plates. The plurality of fuel cell stacks yields a voltage sufficient to power an electric vehicle.

In a further embodiment, a method for operating the fuel cell assembly includes the steps of providing a plurality of fuel cell stacks including a plurality of unitized bipolar plates and a plurality of unitized membrane-electrode assemblies, connecting the fuel cell stacks in electrical series, and selectively supplying gaseous reactants to each of the plurality of fuel cell stacks. A fuel cell assembly having a voltage sufficient to power an electric vehicle is thereby provided.

DRAWINGS

The above, as well as other advantages of the present disclosure, will become readily apparent to those skilled in the art from the following detailed description, particularly when considered in the light of the drawings described hereafter.

DETAILED DESCRIPTION OF THE INVENTION

Figure 1:
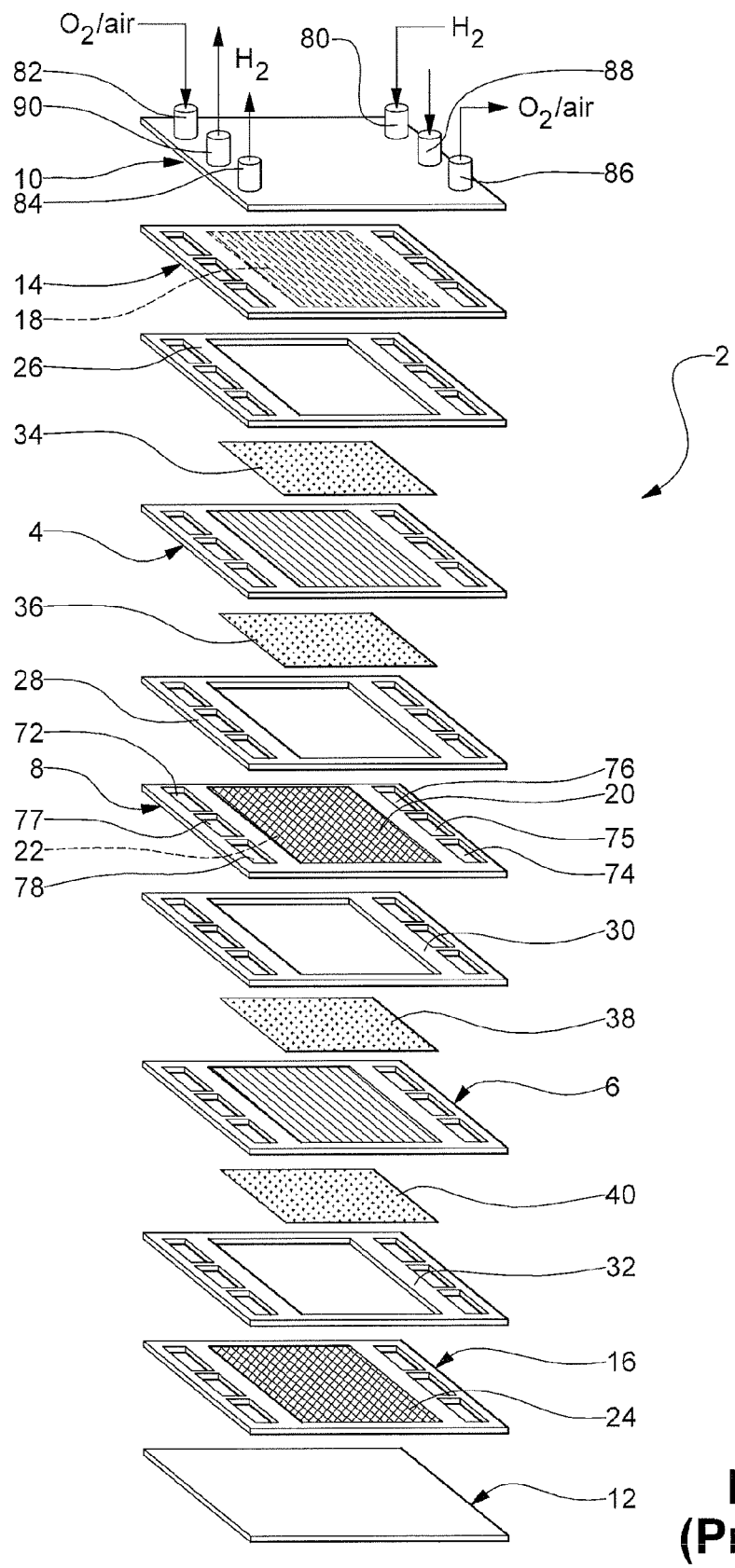
FIG. 1 illustrates a schematic, exploded perspective view of a PEM fuel cell stack of the prior art, showing only two cells.

The following description is merely exemplary in nature and is not intended to limit the present disclosure, application, or uses. It should also be understood that throughout the drawings, corresponding reference numerals indicate like or corresponding parts and features. In respect of the methods disclosed, the steps presented are exemplary in nature, and thus, are not necessary or critical.

FIG. 1 depicts an illustrative fuel cell stack 2 having a pair of MEAs 4, 6 separated from each other by an electrically conductive bipolar plate 8. For simplicity, only a two-cell stack (i.e. one bipolar plate) is illustrated and described in FIG. 1, it being understood that the typical fuel cell stack 2 will have many more such cells and bipolar plates.

The MEAs 4, 6 and bipolar plate 8 are stacked together between a pair of clamping plates 10, 12 and a pair of unipolar end plates 14, 16. The clamping plates 10, 12 are electrically insulated from the end plates 14, 16 by a gasket or a dielectric coating (not shown). The unipolar end plate 14, both working faces of the bipolar plate 8, and the unipolar end plate 16 include respective active areas 18, 20, 22, 24. The active areas 18, 20, 22, 24 are typically flow fields for distributing gaseous reactants such as hydrogen gas and air over an anode and a cathode, respectively, of the MEAs 4, 6.

The bipolar plate 8 is typically formed by a conventional process for shaping sheet metal such as stamping, machining, molding, or photo etching through a photolithographic mask, for example. In one embodiment, the bipolar plate 8 is formed from unipolar plates which are then joined. It should be further understood that the bipolar plate 8 may also be formed from a composite material. In one particular embodiment, the bipolar plate 8 is formed from a graphite or graphite-filled polymer.

Nonconductive gaskets 26, 28, 30, 32 provide seals and an electrical insulation between the several components of the fuel cell stack 2. Gas-permeable diffusion media 34, 36, 38, 40 are adjacent the anodes and the cathodes of the MEAs 4, 6. The end plates 14, 16 are disposed adjacent the diffusion media 34, 40, respectively, while the bipolar plate 8 is disposed adjacent the diffusion media 36 on the anode face of MEA 4. The bipolar plate 8 is further disposed adjacent the diffusion media 38 on the cathode face of MEA 6.

The bipolar plate 8, unipolar end plates 14, 16, and the gaskets 26, 28, 30, 32 each include a cathode supply aperture 72 and a cathode exhaust aperture 74, a coolant supply aperture 75 and a coolant exhaust aperture 77, and an anode supply aperture 76 and an anode exhaust aperture 78. Supply manifolds and exhaust manifolds of the fuel cell stack 2 are formed by an alignment of the respective apertures 72, 74, 75, 77, 76, 78 in the bipolar plate 8, unipolar end plates 14, 16, and the gaskets 26, 28, 30, 32. The hydrogen gas is supplied to an anode supply manifold via an anode inlet conduit 80. The air is supplied to a cathode supply manifold of the fuel cell stack 2 via a cathode inlet conduit 82. An anode outlet conduit 84 and a cathode outlet conduit 86 are also provided for an anode exhaust manifold and a cathode exhaust manifold, respectively. A coolant inlet conduit 88 is provided for supplying liquid coolant to a coolant supply manifold. A coolant outlet conduit 90 is provided for removing coolant from a coolant exhaust manifold. It should be understood that the configurations of the various inlets 80, 82, 88 and outlets 84, 86, 90 in FIG. 1 are for the purpose of illustration, and other configurations may be chosen as desired.

Figure 2:
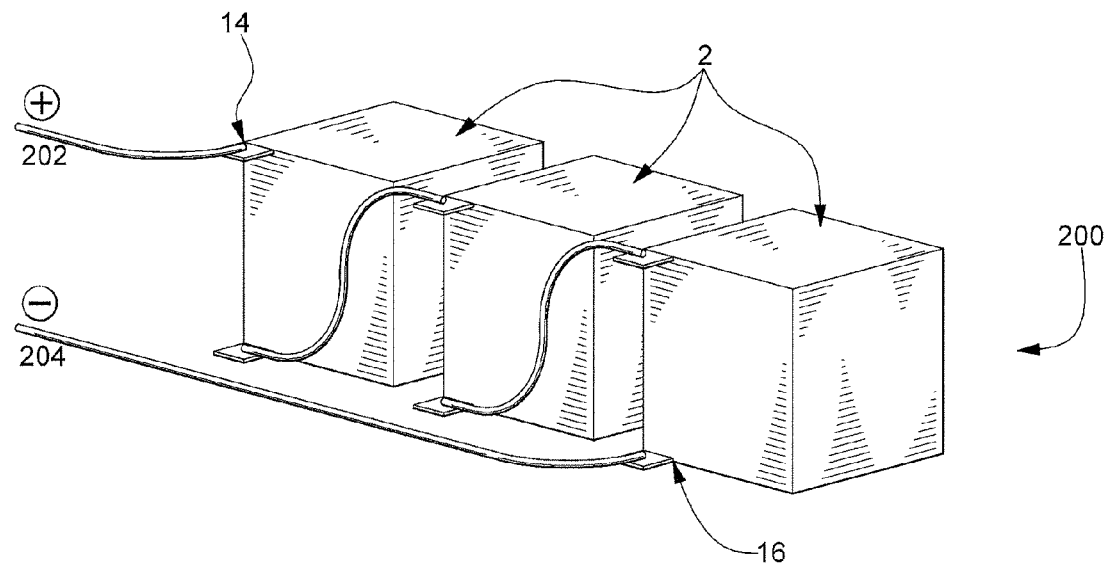
FIG. 2 is a perspective view of a fuel cell assembly including a plurality of fuel cell stacks connected in series according to an embodiment of the present disclosure.

FIG. 2 shows a plurality of individual fuel cell stack 2 units in a fuel cell assembly 200. The plurality of individual fuel cell stacks 2 may be disposed adjacent one another to form a "bank" of fuel cell stacks 2, thus enabling a convenient placement of the fuel cell assembly 200 in a vehicle. Each of the fuel cell stacks 2 is adapted to receive a dedicated supply of gaseous reactants. The dedicated supplying of gaseous reactants enables an independent control of the fuel cell stack 2 units of the fuel cell assembly 200.

The fuel cell stacks 2 are electrically connected in series to a first terminal 202 and second terminal 204. The first terminal 202 may be connected to one of the end plates 14 of the fuel cell stacks 2, and the second terminal 204 may be connected to one of the end plates 16 of the fuel cell stacks 2, for example. The first terminal 202 and the second terminal 204 are in electrical communication with an external load (not shown) such as a drive of an electric vehicle or a battery bank, for example.

Figure 3:
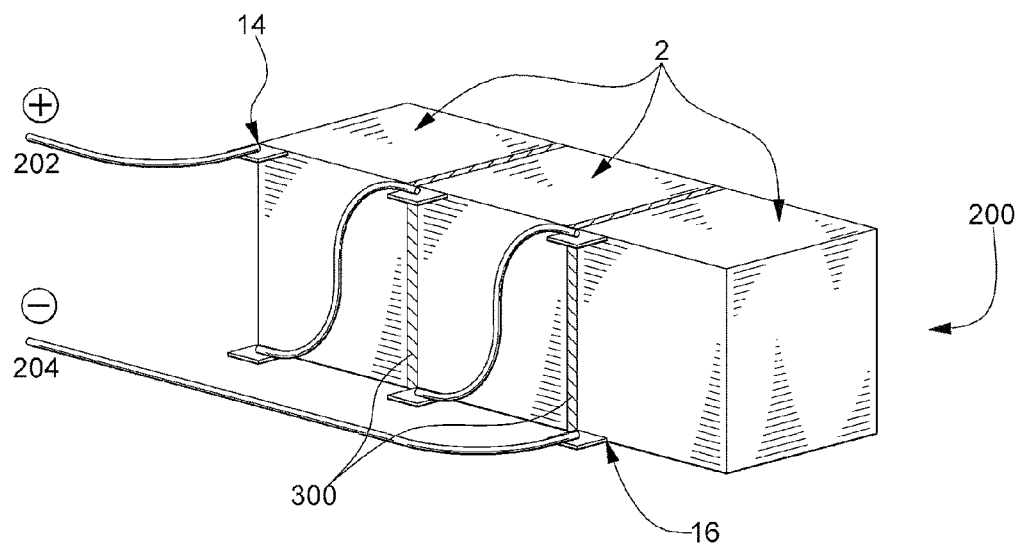
FIG. 3 is a perspective view of a fuel cell assembly including plurality of fuel cell stacks connected in series according to an embodiment of the present disclosure.

FIG. 3 shows a plurality of fuel cell stacks 2 joined together to form the fuel cell assembly 200 according to an embodiment of the present disclosure. In the embodiment shown, the fuel cell assembly 200 includes at least one electrically insulating layer 300 disposed between adjacent fuel cell stacks 2. The electrically insulating layer 300 is formed of any conventional electrically insulating material known in the art such as a thermoplastic material and a thermoset material, for example. It is understood that the thermoplastic material and thermoset material may be rigid or elastic. A skilled artisan should appreciate that other suitable insulating materials may be employed as desired.

Figure 4:
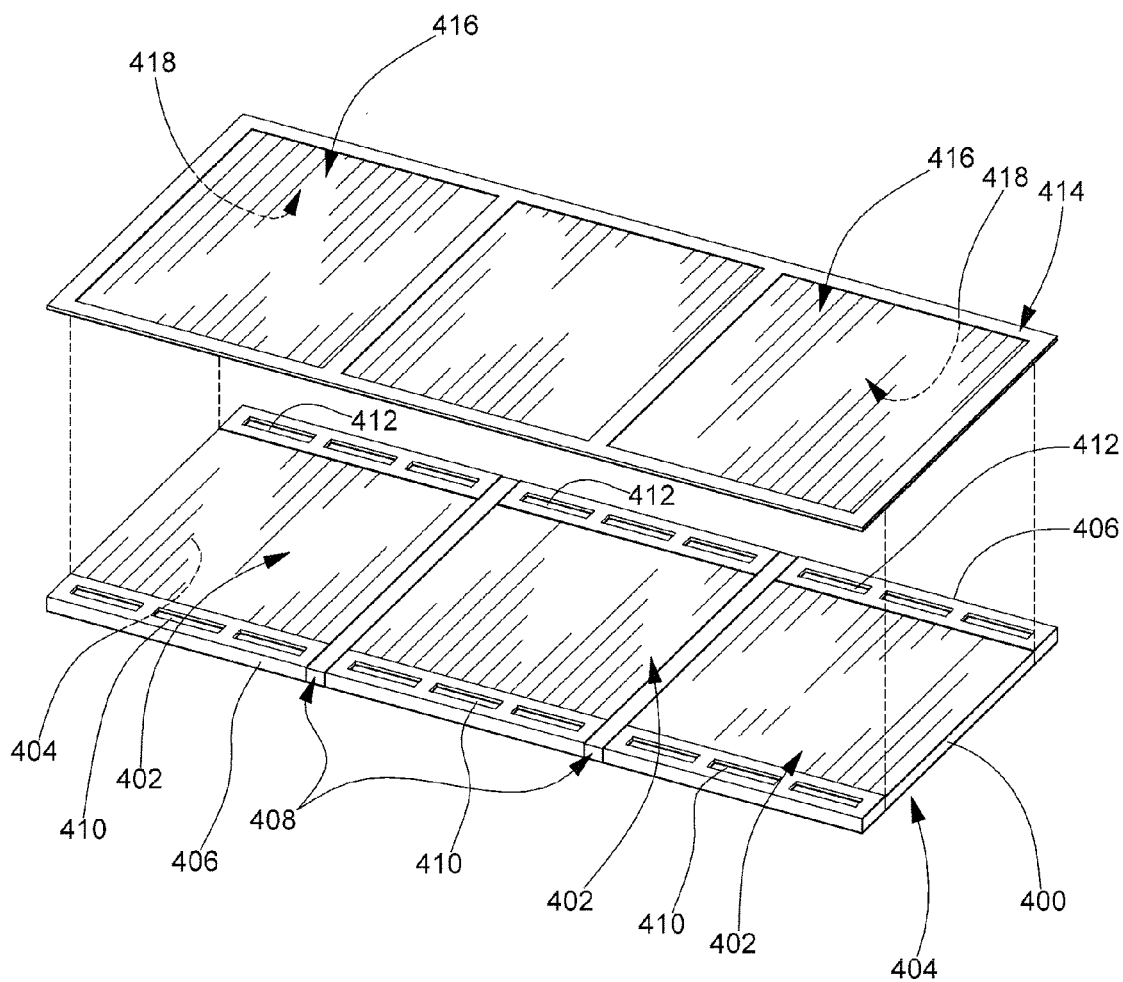
FIG. 4 is an enlarged perspective view of a unitized fuel cell plate and a unitized membrane assembly of the fuel cell assembly illustrated in FIG. 3.

FIG. 4 illustrates a unitized plate 400 of the fuel cell assembly 200. The unitized plate 400 is adapted to be stacked with corresponding fuel cell components, such as MEAs, gaskets, and endplates, in a configuration substantially as shown in FIG. 1. As used herein, the term "unitized" means that the unitized plates 400 provide independently operating fuel cell stack 2 units when stacked to form the fuel cell assembly 200. It is understood that the unitized plate 400 can be a bipolar plate or a unipolar plate, if desired. In the embodiment shown, the unitized plate 400 is formed with a plurality of active regions 402, 404. The active regions 402, 404 of the unitized plate 400 are electrically conductive and serve as current collectors for the fuel cell stacks 2 in the fuel cell assembly 200. The active regions 402, 404 are electrically insulated from one another.

Headers 406 are disposed at a first end and a second end of the unitized plate 400. In particular embodiments, the headers 406 are formed from an electrically insulating or dielectric material having an electrical resistance sufficient to militate against a flow of electrical current therethrough. The active regions 402, 404 are further separated by electrically insulating dividers 408. The electrically insulating dividers 408 may be formed from any conventional electrically insulating material known in the art such as a thermoplastic material and a thermoset material, for example. It is understood that the thermoplastic material and thermoset material may be rigid or electrometric. A skilled artisan should appreciate that other suitable insulating materials may be employed as desired.

The fuel cell assembly 200 may include a border or frame (not shown). In particular embodiments, the frame holds the unitized plate 400. The frame can be constructed from a number of suitable materials including, but not limited to, dielectric materials such as rigid thermoplastics, thermosets, elastomers, and thermoplastic elastomers. In particular embodiments, the frame is integral with at least one of the headers 406 and the electrically insulating dividers 408. It may be further desirable to mold an integral seal to the unitized plates 400, for example, via the frame. The integral seal may be formed by a molding process known in the art.

The headers 406 may include a plurality of inlet apertures 410 and a plurality of outlet apertures 412 that define a plurality of inlet manifolds and a plurality of outlet manifolds, respectively, when the fuel cell assembly 200 is fully assembled. In another embodiment, the inlet and outlet apertures 410, 412 are formed in the border or frame. In one embodiment, the headers 406 include a seal integrally formed thereon.

The inlet and outlet apertures 410, 412 correspond substantially to the inlet and outlet apertures 72, 74, 76, 78. It should be appreciated that each fuel cell stack 2 unit receives a supply of reactants via dedicated supply manifolds formed by the inlet apertures 410. The fuel cell stack 2 formed with the unitized plates 400 are thereby independently operable.

In a particular embodiment, each of the active regions 402, 404 is in fluid communication with a dedicated inlet aperture 410. The inlet apertures 410 are thereby adapted to selectively deliver gaseous reactants, such as air and hydrogen, as desired to the active regions 402, 404. Each of the plurality of active regions 402, 404 may further be in fluid communication with a dedicated outlet aperture 412. In an illustrative embodiment, the individual inlet aperture 410 delivers the gaseous reactants to one of the active regions 402. The individual outlet aperture 412 may be adapted to independently receive an exhaust stream from the individual active region 402.

A skilled artisan should appreciate that the fuel cell assembly 200 may be adjusted to a desired voltage by limiting a supply of gaseous reactants to a portion of the fuel cell stacks 2 formed with the unitized plates 400. For example, gaseous reactants may be selectively provided to some fuel cell stacks 2 and not provided to other fuel cell stacks 2 formed by the unitized plates 400. For example, when one fuel cell stack 2 unit becomes inoperable or begins to exhibit an undesirable performance, the gaseous reactants may be directed away from the inoperable unit and the supply to the other units adjusted accordingly.

Similarly, one of ordinary skill should appreciated that the unitized plates 400, having the inlet apertures 410 adapted to selectively deliver gaseous reactants to the active regions 402, 404, enables operational strategies such as flow shifting and stack order switching, for example. Flow shifting involves an alternating flow of gaseous reactants through a first stack and a second stack connected in series, wherein a direction of the flow through the stacks alternates. Stack order switching involves an alternating flow of gaseous reactants through the first stack to the second stack connected in series, wherein the direction of flow through the fuel cell stacks 2 remains constant. These methods of operating the fuel cell stacks 2 may facilitate moisture control and optimize an operability of the fuel cell stacks 2.

As further shown in FIG. 4, a single, unitized MEA 414 may have a plurality of catalyst regions 416, 418 that form the anodes and cathodes of the fuel cell stack 2 units. The plurality of catalyst regions 416, 418 may be separated by an electrolyte membrane, with the catalyst regions 416, 418 applied by a patch coating process, for example. In another embodiment, the MEA 414 has the catalyst disposed substantially evenly along a length of the MEA 414 surfaces, with the catalyst regions 416, 418 being formed by openings in a matrix or screen layer bonded to the MEA 414 surfaces. The matrix or screen layer is disposed over the catalyst and has openings that expose and define the boundaries of the catalyst regions 416, 418. The matrix or screen may be formed from a dielectric material as described herein. Other suitable means for applying the catalyst regions 416, 418 may be used as desired.

The unitized MEA 414 is configured for assembly with the unitized plates 400. The unitized plate 400 is generally disposed between a pair of the unitized MEAs 414. As a non-limiting example, the catalyst regions 416, 418 are aligned with and adapted to abut the active regions 402, 404 of the unitized plate 400 when the unitized plate 400 and the unitized MEA 414 are arranged in the fuel cell assembly 200.

One of ordinary skill in the art should understand that the unitized plates 400 and the unitized MEAs 414 form a plurality of independently functioning fuel cell stacks 2 when assembled. Thus, the fuel cell stacks 2 formed with the unitized plates 400 may be operated substantially independently of one another by controlling a flow of the gaseous reactants to the fuel cell stacks 2. The independent fuel cell stacks 2 formed from the unitized plates 400 and the MEAs 414 may also be electrically linked in series to provide a desired voltage.

In a typical fuel cell assembly, a voltage converter (not shown) is employed to boost the electrical voltage of the fuel cell stack. In the present invention, the plurality of fuel cell stacks 2 units connected in series form a fuel cell assembly 200 wherein a voltage generated is maximized. In a particular embodiment, the fuel cell assembly 200 may be constructed with a plurality of the unitized plates 400 and a plurality of the MEAs 414. For example, the active regions 402, 404 are electrically connected in series to boost the electrical voltage of the fuel cell assembly 200 in accordance with Ohm's Law. As a further nonlimiting example, one 230-cell stack with about 800 $cm^2$ of active area per cell may be replaced by three 200-cell stacks with about 300 $cm^2$ of active area per cell. A skilled artisan should thereby understand that a single fuel cell stack having a voltage converter to boost the electrical voltage can be replaced by the fuel cell assembly 200 of the present disclosure. It should further be understood that constructing the fuel cell assembly 200 from the unitized plates 400 and the unitized MEAs 414 minimizes a complexity thereof.

The present disclosure further includes a method for operating the fuel cell assembly 200. In one embodiment, the method includes the steps of providing the fuel cell assembly 200 as described herein with the plurality of fuel cell stacks 2 formed with the unitized plates 400. Each of the fuel cell stacks 2 of the assembly 200 is adapted to receive a supply of gaseous reactants. The fuel cell stacks 2 are then connected in electrical series. The gaseous reactants may be selectively supplied to each of the plurality of fuel cell stacks 2 as desired. For example, the gaseous reactants may be selectively supplied to adjust the voltage to a desired level. In other embodiments, the gaseous reactants may be selectively supplied according to one or more operational strategies, such as stack order switching, as previously described herein. It should be understood that other suitable operational strategies may be employed with the fuel cell assembly 200 of the disclosure by selectively supplying the gaseous reactants to one or more of the plurality of fuel cell stacks 2.

While certain representative embodiments and details have been shown for purposes of illustrating the invention, it will be apparent to those skilled in the art that various changes may be made without departing from the scope of the disclosure, which is further described in the following appended claims.

What is claimed is:

1. A fuel cell plate, comprising:
   a unitized plate including a plurality of first headers disposed at a first end of the plate, a plurality of second headers disposed at a second end of the plate, and a plurality of active regions formed thereon, an inlet aperture formed in each of the first headers, an outlet aperture formed in each of the second headers, each of the active regions including a flowfield disposed between one of the first headers and one of the second headers, and each of the flowfields in fluid communication with the inlet aperture of one of the first headers and the outlet aperture of one of the second headers,
   wherein the active regions are separated and electrically insulated from one another by at least one dielectric divider, the at least one dielectric divider disposed between an adjacent pair of the active regions and abutting an edge of each of the adjacent pair of the active regions,
   wherein the first headers are separated from one another by the at least one dielectric divider,
   wherein the second headers are separated from one another by the at least one dielectric divider,
   wherein the at least one dielectric divider includes an insulating strip,
   wherein each of the active regions is adapted to receive a dedicated supply of a reactant,
   wherein the inlet aperture of one of the first headers is adapted to selectively deliver the reactant to one of the active regions, and wherein the outlet aperture of one of the second headers is adapted to selectively exhaust the reactant from one of the active regions.

2. The fuel cell plate of claim 1, wherein the first headers and the second headers are dielectric and are formed integral with a dielectric frame adapted to be disposed on the plate.

3. The fuel cell plate of claim 1, wherein the plate is formed from an electrically conductive composite material.

4. The fuel cell plate of claim 3, wherein the electrically conductive composite material is a graphite-filled polymer.

5. The fuel cell plate of claim 1, wherein the plate is a bipolar plate.

6. The fuel cell plate of claim 1, wherein the plate has a seal integrally formed thereon.

* * * * *